(12) United States Patent
Oldewurtel et al.

(10) Patent No.: US 10,272,930 B2
(45) Date of Patent: Apr. 30, 2019

(54) AXLE COUNTING METHOD AND AXLE COUNTING DEVICE

(71) Applicant: Thales Deutschland GmbH, Ditzingen (DE)

(72) Inventors: Kassen Oldewurtel, Markgroeningen (DE); Rainer Klemm, Steinheim (DE); Mathias Mueller, Munich (DE)

( * ) Notice: Subject to any disclaimer, the term of this patent is extended or adjusted under 35 U.S.C. 154(b) by 0 days.

(21) Appl. No.: 15/709,459

(22) Filed: Sep. 19, 2017

(65) Prior Publication Data

US 2018/0022367 A1  Jan. 25, 2018

Related U.S. Application Data

(63) Continuation of application No. PCT/EP2016/054480, filed on Mar. 2, 2016.

(30) Foreign Application Priority Data

Mar. 20, 2015  (EP) ..................................... 15160078

(51) Int. Cl.
  *B61L 1/16*  (2006.01)
  *G01L 1/24*  (2006.01)

(52) U.S. Cl.
  CPC .............. *B61L 1/166* (2013.01); *G01L 1/246* (2013.01)

(58) Field of Classification Search
  CPC ................. B61L 1/166; B61L 23/041
  See application file for complete search history.

(56) References Cited

U.S. PATENT DOCUMENTS

| | | | | |
|---|---|---|---|---|
| 8,861,973 B2 * | 10/2014 | Tam | ...................... | B61L 23/041 |
| | | | | 398/140 |
| 2008/0019701 A1 * | 1/2008 | Tam | ........................ | B61L 1/166 |
| | | | | 398/141 |
| 2018/0022367 A1 * | 1/2018 | Oldewurtel | ............. | G01L 1/246 |
| | | | | 246/122 R |

FOREIGN PATENT DOCUMENTS

| | | |
|---|---|---|
| CN | 101376392 A | 3/2009 |
| CN | 101788310 A | 7/2010 |
| CN | 101 863 278 A | 10/2010 |
| EP | 0130226 A1 * 1/1985 | .............. B61L 1/165 |
| EP | 1902923 A2 * 3/2008 | .............. B61L 1/166 |
| EP | 2 112 047 A2 | 10/2009 |
| JP | 2007-263937 A | 10/2007 |
| JP | 2007-530352 A | 11/2007 |
| WO | 2005/093971 A1 | 10/2005 |
| WO | WO-2005093971 A1 * 10/2005 | .............. B61L 1/166 |

* cited by examiner

*Primary Examiner* — Jason C Smith
(74) *Attorney, Agent, or Firm* — Hackler Daghighian Martino & Novak

(57) ABSTRACT

An axle-counting method for railbound vehicles includes the following method steps: coupling light into at least one sensor fiber, wherein the sensor fiber includes at least one fiber Bragg grating mounted on a rail, wherein each fiber Bragg grating has a reflection spectrum having a reflection peak which is at a Bragg wavelength and has a full width at half maximum; generating a difference signal from two shear stress signals through detection and filtering the temporal intensity course of the light power reflected by two Fiber Bragg gratings which are arranged at a separation from one another; and generating a wheel signal if the difference signal exceeds a predetermined shear stress difference limiting value.

22 Claims, 6 Drawing Sheets

AXLE COUNTING METHOD AND AXLE COUNTING DEVICE

CROSS-REFERENCE TO RELATED APPLICATIONS

This continuation application claims priority to PCT/EP2016/054480 filed on Mar. 2, 2016 which has published as WO 2016/150670 A1 and also the European application number 15 160 078.0 filed on Mar. 20, 2015, the entire contents of which are fully incorporated herein with these references.

DESCRIPTION

Field of the Invention

The invention relates to an axle-counting method for railbound vehicles comprising: coupling light into at least one sensor fiber, the sensor fiber comprising at least one fiber Bragg grating mounted on a rail, each fiber Bragg grating having a reflection spectrum (intensity profile of the light output reflected by the fiber Bragg grating depending on the wavelength) having a reflection peak which is at a Bragg wavelength and has a full width at half maximum, and detecting the light reflected by two fiber Bragg gratings spaced apart from one another.

BACKGROUND OF THE INVENTION

Such a method is known from the application DE 10 2014 100 653.4 which has published as U.S. 2016/0356661 A1.

Axle-counting systems are known in which axles travelling past a counting unit are detected by means of induction. The problem with said systems is that electromagnetic fields, for ex-ample from air conditioning units mounted on the train, can lead to interference and miscounting.

WO 2005/093971 A1 describes a railway monitoring system in which sensor fibers which are attached to the track are used for counting axles. By coupling light into the optical fibers (sensor fibers), light is emitted into the fiber Bragg grating, wavelengths which are within the filter bandwidth around the Bragg wavelength, being reflected. The Bragg wavelength is generally defined as $\lambda_B = n_{eff} \cdot 2\Lambda = n_{eff} \cdot \lambda$, where $n_{eff}$ is the effective refractive index and $\Lambda$ is the grating period of the fiber Bragg grating. As a result of a force acting thereon, the sensor fiber and thus the fiber Bragg grating is stretched and the reflection and transmission wave-length of the fiber Bragg grating changes such that, on the basis of the stretching of the fiber Bragg grating, light of different wavelengths is reflected and can be transmitted to an evaluation and analysis unit. The individual fiber Bragg gratings are mounted at a distance of 2.5 m apart from one another. The individual fiber Bragg gratings have different Bragg wavelengths, wherein the difference of the Bragg wavelengths has to be greater than the change in Bragg wavelength of the corresponding fiber Bragg grating owing to loads.

Application DE 10 2014 100 653.4 describes a rail measurement system for measuring a mechanical variable, which acts on a rail, by means of fiber optic sensors. The fiber Bragg gratings used in this case are attached to the rails at an angle of from ±30° to ±60°, in particular of ±45°, relative to the neutral fiber. This offers the advantage that shear strains, which lead to a positive or negative stretching and do not extend parallel to the neutral fiber, are detected by the fiber optic sensor unit.

One disadvantage of the known arrangements is that the sensitivity is not sufficient in order to detect every axle reliably, meaning that the safety integrity level required for trains (SIL4) is not ensured since the signals that emerge from the measurement of the shear stress are not suitable for performing a threshold value evaluation.

SUMMARY OF THE INVENTION

Object of the Invention:

The object of the invention is to propose an axle-counting method which on the one hand is not very susceptible to interference, in particular with respect to electromagnetic interference, and on the other hand has sufficient sensitivity in order to meet the required safety integrity level.

Description of the Invention:

This object is achieved in accordance with the invention in that the following method steps are provided: generating a shear stress difference signal; generating a wheel signal within a signal-processing unit if the shear stress difference signal exceeds a predetermined upper limiting value or falls below a predetermined lower limiting value.

According to the invention, a shear stress difference signal, i.e. a signal by means of which the temporal changes of the difference of two shear stresses at two sensor positions that are spaced apart from one another can be deduced, is generated. The shear stress difference signal becomes very large in terms of its absolute value in the range of the change in algebraic sign of the shear stress (i.e. when the discharge of a force into the rail by the wheel occurs precisely between the two fiber Bragg gratings), which allows a simple detection of a wheel. A shear stress signal, i.e. a signal by means of which the shear stress occurring at a certain sensor position can be deduced, can, for example, be received as a result of detection of the light reflected by the fiber Bragg grating mounted at the sensor position, the fiber Bragg grating being arranged obliquely with respect to the neutral fiber, in particular at an angle of ±45° or ±90°. The shear stress difference signal is generated by detecting and establishing the difference in the temporal profile of the change in wavelength of the Bragg wavelengths of the fiber Bragg gratings, the wavelength change being determined by detecting the change in intensity of the reflected light of the fiber Bragg grating. This can be achieved in various ways and is described in detail below with reference to various variants. In the case of all of the variants, the temporal intensity profile of the light output reflected in the sensor fiber(s) is detected, preferably by means of one or more fiber-coupled photodiodes.

Preferred Variants:

A particularly advantageous variant of the axle-counting method (OEC concept) according to the invention is characterized in that sensor fibers each having two fiber Bragg gratings that are arranged in a row and have different Bragg wavelengths are used at two sensor positions that are spaced apart from one another in the rail direction and in that the shear stress difference signal is generated optically within a signal-processing unit by means of an optoelectronic component by the temporal intensity profile of the light output reflected in the sensor fiber being detected by means of the optoelectronic component and filtered at two filter edges of a wavelength filter of the optoelectronic component, the filter edges each being in the range of one of the Bragg wavelengths of the fiber Bragg gratings and having gradients having different algebraic signs, and in that the filtered intensity profile is detected as the difference signal. By processing the difference signal within the signal-processing unit, (digital) wheel signals are generated.

In the case of the OEC concept, optoelectronic components (OE chips) are used for measuring the reflected light output and for signal conversion. Owing to the loads on the sensor positions and the associated shear stresses, the Bragg wavelengths of the fiber Bragg gratings shift. The portions of the reflected light output originating from the various fiber Bragg gratings are subject to filtering at different filter edges. The changes in the Bragg wavelengths are a measure for the shear stresses occurring. The optical difference of the shear stress signals is established in that the portions of the reflected light output of the two fiber Bragg gratings originating from the various fiber Bragg gratings (total spectrum of the light reflected by the two fiber Bragg gratings) along one filter edge in each case of the optoelectronic component shift, the filter edges having gradients with different algebraic signs. The portions of the reflected light output of the two sensor elements are thus filtered to varying extents. The Bragg wavelengths and the filter edges are preferably adapted to one another such that during an assumed load, the reflection peak of the fiber Bragg grating does not shift into the other filter edge in each case. In this manner, a minimum and a maximum (the algebraic sign depends on the angular orientation (±45°) of the fiber Bragg grating with respect to the neutral fiber depending on how the fiber Bragg gratings are aligned with respect to the neutral fiber) emerge in the profile of the reflected light output, when the difference in the shear stresses at the two sensor positions becomes very large. This can be digitalized by a comparator.

In order for the total output to remain constant in the event of small changes, it is advantageous for the full widths at half maximum (FWHM) of the spectra and their reflectivity's (R) of the fiber Bragg gratings to be similar. In a particularly advantageous variant, the full widths at half maximum of the reflection peaks of the two fiber Bragg gratings therefore differ by less than 0.5 nm and the reflectivity's of said gratings differ by less than 20%. Apart from this, the deviations from the operating point (preferably the central position) in the filter edge should be small, typically <1 nm. Otherwise, undershoots and overshoots can occur before and after the minimum output, which consequently restrict the minimally detectable loads. Fiber Bragg gratings having the following values, for example, can be used for detecting train axles on a rail: $\lambda 1=1541.9$ nm, $R1=45\%$, $FWHM1=550$ pm; $\lambda 2=1550.1$ nm, $R=55\%$, $FWHM=650$ pm.

Preferably, a reference signal is detected from the temporal intensity profile of the light output reflected in the sensor fiber, without said reference signal being filtered by means of the optoelectronic component, and the difference signal is compared with the reference signal.

In an alternative variant (RR concept) of the method according to the invention, sensor fibers having two fiber Bragg gratings that are arranged in a row and have different Bragg wavelengths are used at two sensor positions that are spaced apart from one another in the rail direction, the shear stress difference signal being generated optically by a spectral overlap of the reflection peaks of the two fiber Bragg gratings during the transition from an unloaded state to a loaded state. By processing the difference signal within the signal processing unit, (digital) wheel signals are generated.

The shift of the Bragg wavelengths is a measurement for the shear stress occurring at the sensor position in each case. The degree of overlap of the reflection peak is a measurement for the shear stress difference.

The overlapping of the reflection peak preferably occurs in the loaded state. In this variant, the Bragg wavelengths of the two fiber Bragg gratings are selected such that the reflection peaks of the two fiber Bragg gratings of one rail-contacting half overlap in the loaded state. The more the reflection peaks overlap, the less light is reflected. The loading of the rail is accordingly detected as a minimum intensity. In this variant, a shear stress difference signal is therefore generated as a result of the overlapping of the reflection peaks when the rails are loaded. For this purpose, the spacing between the Bragg wavelengths of the fiber Bragg gratings is selected according to the invention such that in the event of a load having an expected mass, a perceptible overlap, preferably a full overlap, of the reflection peaks occurs. It is, however, also possible to select the spacing and the full widths at half maximum such that the reflection peaks overlap in the unloaded state and shift away from one another during loading. In this case, a maximum intensity would be measured during loading.

This RR concept is characterized by a low complexity of signal processing on the adapter board.

In a third variant (OE2 concept) of the axle-counting method according to the invention, two sensor fibers each having one fiber Bragg grating are used, the fiber Bragg gratings of different sensor fibers being arranged at sensor positions that are spaced apart from one another in the rail direction. According to the invention, for each sensor fiber, a filtered signal of the temporal intensity profile of the light output reflected by the fiber Bragg grating is generated within a signal-processing unit by filtration at each filter edge of a wavelength filter of an optoelectronic component, the shear stress difference signal of the two fiber Bragg gratings being generated electronically by means of a microcontroller. The light reflected by the fiber Bragg grating without said light being filtered or rather the electronic signal obtained by processing the signal from said light acts as the reference signal (light output signal that has not been optically filtered).

In this variant, therefore, the shear stress difference signal is not determined within a rail-contacting half but rather in the microcontroller from the signals processed by the optoelectronic components of the two rail-contacting halves. A difference of electrical signals is therefore carried out.

It is particularly advantageous for a reference signal to be detected from the temporal intensity profile of the light output reflected in the sensor fiber, without said reference signal being filtered by means of the optoelectronic component and for the shear stress signal to be determined from the ratio of filtered signal to reference signal. Independence from the irradiated light output is thus achieved.

In order to detect a fault, it is possible to check whether the reference signal exceeds a third limiting value (third limiting value=upper limiting value) or falls below a third limiting value (third limiting value=lower limiting value). The latter variant is preferable, i.e. that a fault is detected if the reference signal falls below a predetermined third limiting value. The axle-counting method is therefore preferably performed according to a "standby light principle" (similar to the standby current principle). This means that in standby operation, a signal reflected by the fiber Bragg gratings is detected continuously. If the light source fails or if a cable (for example, between the rail contact and the signal processing board) is cut, then the reference signal falls below the predetermined limiting value, as a result of which a simple fault detection of the optical components can be achieved. In this way, the detection of possible defects (failure of the light source, cutting of a cable, contamination at socket positions) in the optical part of the signal processing system, the glass fiber supply line and at the sensor itself is made possible without an additional diagnostic device (self-testing functionality of the fiber Bragg grating). A test can, for example, be carried out in that the light source is switched off for a short time. Another possibility is to modulate the intensity of the light of the light source. If the detected light has the same modulation, the test is rated as successful. It is not necessary in this case to switch off the light source.

The invention also relates to axle-counting devices for performing the various variants of the method according to the invention.

A first axle-counting device according to the invention (OEC axle counter) comprises a light source, at least one counting unit, each counting unit comprising two rail-contacting halves for mounting to a rail. According to the invention, each rail-contacting half comprises a sensor fiber comprising a first fiber Bragg grating having a first Bragg wavelength and a second fiber Bragg grating having a second Bragg wavelength, the fiber Bragg gratings being designed to be mounted on the rail obliquely with respect to the neutral fiber. In addition, the rail-contacting half comprises an optoelectronic component for performing an optical subtraction of the light output reflected by the two fiber Bragg gratings of a sensor fiber, the optoelectronic component comprising a wavelength-dependent filter having two filter edges, the filter edges each being in the range of one of the Bragg wavelengths of the fiber Bragg grating and having gradients having different algebraic signs.

Preferably, the gradients of the filter edges are of the same absolute value. In this case, it is sufficient if the gradients are of the same absolute value in the range within which the Bragg wavelengths shift.

In order to save material, the fiber Bragg gratings of the two rail-contacting halves of one counting unit can be arranged within a common sensor fiber. The signals can be assigned to the individual rail-contacting halves by means of a frequency-separating filter. In a particularly material-saving development of this embodiment, the rail-contacting halves of a counting unit have a common fiber Bragg grating.

A second axle-counting device according to the invention (RR axle counter) comprises a light source and at least one counting unit, each counting unit comprising two rail-contacting halves for mounting to a rail, each rail-contacting half comprising a sensor fiber comprising two fiber Bragg gratings arranged in a row at two sensor positions that are spaced apart from one another, the fiber Bragg gratings being designed to be mounted on the rail obliquely with respect to the neutral fiber and the Bragg wavelengths of the two fiber Bragg gratings and the distance between the two sensor positions being selected such that the reflection spectra of the two fiber Bragg gratings overlap when the rail is subjected to a predetermined load between the two sensor positions. In addition, a signal-processing unit for detecting and subsequently processing the light reflected by the fiber Bragg grating is provided.

Preferably, the Bragg wavelengths of the two fiber Bragg gratings and the distance between the two sensor positions (i.e. the distance between identical parts of the two fiber Bragg gratings) are selected such that the two reflection spectra of the fiber Bragg gratings fully overlap during a predetermined loading of the sensor positions.

In order to achieve a good saturation effect, one of the fiber Bragg gratings should have a reflection peak having a large full width at half maximum whereas the full width at half maximum of the reflection peak of the other fiber Bragg grating should be small. The full widths at half maximum of the reflection peaks of the two fiber Bragg gratings therefore preferably differ by 1 to 2 orders of magnitude. As a result of this, a full overrun of the reflection peaks in the event of heavy trains is prevented which would otherwise result in two peaks per axle in the intensity profile of the reflected light output.

It is particularly advantageous if the Bragg wavelengths of the two fiber Bragg gratings do not differ by more than 5 nm, and the full width at half maximum of one fiber Bragg grating is at least 0.05 nm and the full width at half maximum of the other FBG is at most 5 nm. Preferably, the reflection peaks of the two FBGs overlap slightly in the unloaded state, the Bragg wavelength of the first fiber Bragg grating (the fiber Bragg grating facing the signal processing unit) being larger than the Bragg wavelength of the second fiber Bragg grating (the fiber Bragg grating facing away from the signal processing unit).

A third axle-counting device according to the invention (OE2 axle counter) comprises a light source and at least one counting unit each comprising two rail-contacting halves for mounting on a rail. According to the invention, each rail-contacting half comprises a sensor fiber comprising a fiber Bragg grating having a Bragg wavelength, the fiber Bragg grating being designed to be mounted on the rail obliquely with respect to the neutral fiber. Furthermore, each rail-contacting half comprises a signal-processing unit for generating shear stress signals, the evaluation unit comprising an optoelectronic component having a filter edge (optical filter). The axle-counting device has a microcontroller for generating a difference signal of the shear stress signals emitted by the signal-processing units.

The microcontroller is a programmable component, which determines the difference of the shear stress signals from the signals processed by the optoelectronic components of the two rail-contacting halves.

For all of the axle counters according to the invention, a broadband light source, for example, a super-luminescent diode, is preferably used as the light source.

In the case of all of the axle-counting devices according to the invention that are proposed, it is most advantageous for the fiber Bragg gratings (i.e. the extension of the fiber Bragg gratings in the direction of light propagation) to be attached to the rail in parallel with one another at an angle of from ±30° to ±60°, in particular of ±45°, with respect to the neutral fiber. With the aid of the oblique arrangement of the fiber Bragg gratings, shear stresses in the rail are measured by detecting the light reflected by the fiber Bragg gratings when a wheel rolls along the rail. The method is therefore independent of the size of the wheel and of the wheel rim.

Preferably, the fiber Bragg gratings intersect the neutral fiber of the rail.

In the case of an advantageous embodiment of the axle-counting device according to the invention, the fiber Bragg gratings are equipped with a converter structure for compensating for temperature expansion of the rail. The absolute value of the wavelength change resulting from temperature changes of the rail is limited by means of the converter structure. At the same time, the converter structure has the task of enhancing the relatively low strain level of the shear stress in order to be able to detect low axle loads as well.

It is particularly advantageous for the fiber Bragg gratings to be fastened to the rail under pretension. In this way, it can be ascertained in a simple manner if a fiber Bragg grating has come loose from the rail since the Bragg wavelength of the fiber Bragg grating changes when the pretension is no longer present. The fastening of the fiber Bragg grating under pretension makes it possible to detect if a fiber Bragg grating has come loose from the rail since when the fiber Bragg grating comes loose, the pretension is no longer present and the Bragg wavelength of the fiber Bragg grating changes accordingly. Consequently, a permanent wheel signal is emitted. The pretension can be achieved mechanically before attaching the fiber Bragg grating to the rail or thermally by means of a bracket while the bracket is fastened to the rail under pretension.

It is particularly advantageous for a trimming device to be provided for adjusting the pretension under which the FBGs are mounted onto the rail.

Preferably, the signal-processing unit comprises a fiber-optic beam splitter. The beam splitter serves the purpose of picking up a reference signal by means of a second photodiode in addition to the edge-filtered signal.

Further advantages of the invention will emerge from the description and from the drawings. According to the invention, the features that are referred to above and those that are described in further detail hereinafter, can each also be used individually or collectively in any combination. The embodiments shown and described are not to be understood to be a complete list but rather are of a nature for describing the invention by way of example.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
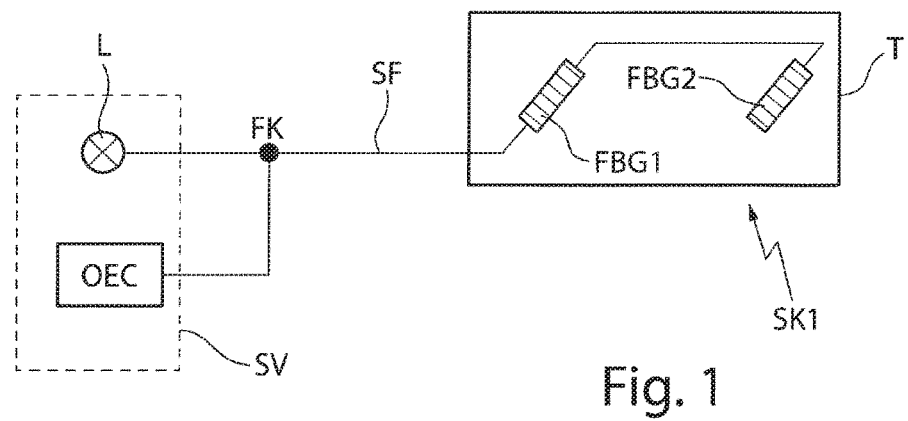
FIG. 1 shows the schematic structure of a rail-contacting half of an axle-counting device according to the invention according to the EOC concept.

FIG. 1 shows the structure of a rail-contacting half SK1 of an axle-counting device according to the invention according to the EOC concept. The rail-contacting half SK1 comprises a sensor fiber SF having two fiber Bragg gratings FBG1, FBG2, which are spaced apart from one another and are preferably pre-assembled on a bracket T such that they can be mounted on a rail S simply in the desired orientation (see FIG. 13a, b). The fiber Bragg gratings FBG1, FBG2 have different Bragg wavelengths $\lambda 1$, $\lambda 2$ and accordingly reflect light of the relevant Bragg wavelength $\lambda 1$, $\lambda 2$. Light is coupled into the sensor fiber SF by means of a light source L. The light reflected by the fiber Bragg gratings FBG1, FBG2 is transmitted to an optoelectronic component OEC by means of a fiber coupler FK, within which optoelectronic component the reflected light is processed. In the present case, the optoelectronic component OEC and the light source L are part of a signal processing unit SV.

Figure 2:
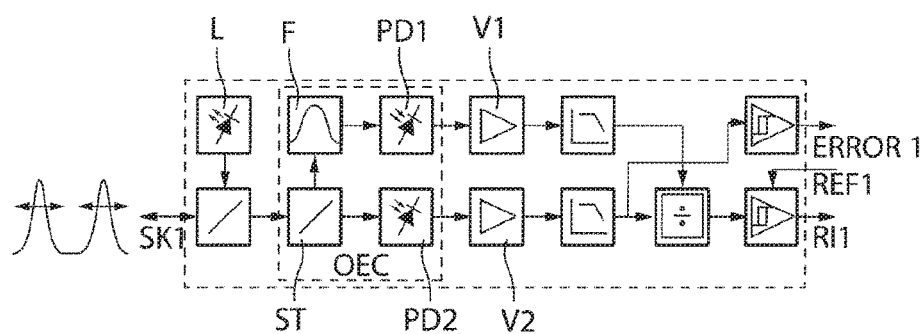
FIG. 2 is a block wiring diagram of the processing of an optical signal received by the rail-contacting half from FIG. 1 (EOC concept)

FIG. 2 shows how the reflected light is subsequently processed within the signal processing unit SV. The reflected light is transmitted from the sensor fiber SF into the optoelectronic component OEC, in which the light is split by means of a beam splitter ST. In a first channel, the reflected light is filtered by means of a wavelength filter F and detected as an electrical difference signal SD by means of a first photodiode PD1. In a second channel, the reflected light is transmitted directly onto a second photodiode PD2 and detected there as a reference signal SR, the reference signal SR being proportional to the total reflected light output. Ac-cording to the invention, the wavelength filter F has two filter edges K1, K2, the two filter edges K1, K2 having gradients that have different algebraic signs. Owing to the different algebraic signs, shifts of the Bragg wavelengths $\lambda 1$, $\lambda 2$ of the two fiber Bragg gratings FBG1, FBG2, for example to larger wavelengths, are evaluated differently, i.e. due to an increase in the detected light output in the case of the first fiber Bragg grating FBG1, and due to a reduction in the detected light output in the case of the other fiber Bragg grating FBG2.

Transimpedance amplifiers V1, V2 convert the difference signal SD and reference signal SR into stress signals. Said stress signals can now be subsequently processed (for example, by low pass filtering). In order to determine the actual measured variable, the ratio between the difference signal SD and the reference signal SR is provided. Path neutrality is thus achieved and measurements which are independent of damping effects are made possible. The signal generated thus is proportional to the axle load, which can be analyzed separately. The analogue signal can be converted into a digital wheel signal (wheel pulse RI1) with the aid of a comparator.

Figure 3:
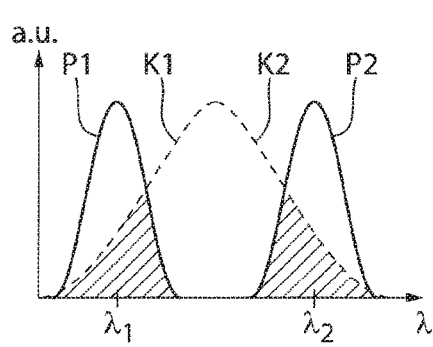
FIG. 3 shows the profile of the reflection peak relative to the filter edges (EOC concept)

FIG. 3 shows a possible profile of the filter edges K1, K2 relative to the reflection peak P1, P2 of the fiber Bragg grating FBG1, FG2. The two filter edges K1, K2 have the same absolute value of gradient, but are inclined in different directions in the diagram shown (different algebraic signs). The reflection peaks P1, P2 of the fiber Bragg gratings FBG1, FBG2 are selected so as to be symmetrical to the filter edges K1, K2. The filter edges K1, K2 extend through the reflection peaks P1, P2 such that shifts of the reflection peaks to larger and to smaller wavelengths lead to a change in light intensity, a shift of the first reflection peak P1 to larger wavelengths causing an increase in intensity, whereas a shift of the second reflection peak P2 to larger wavelengths brings about a reduction in intensity.

Figure 4:
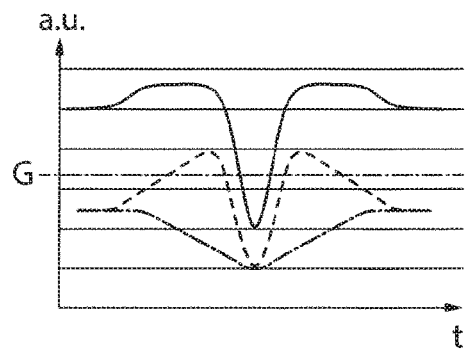
FIG. 4 shows the temporal profile of the photocurrent of the difference signal detected by the photodiodes according to the OEC concept and the portion of the detected photocurrent assigned to the individual fiber Bragg gratings.

FIG. 4 is a diagram of the profile of the difference signal SD (solid curve) and of the portions of the light reflected by the fiber Bragg grating FBG1, FBG2 in each case from the difference signal (FBG1: dashed curve, FBG2: dotted curve). In the example shown, the first fiber Bragg grating is compressed owing to an approaching load and the Bragg wavelength $\lambda 1$ of the first fiber Bragg grating FBG1 is shifted to larger wavelengths, i.e. along the rising filter edge K1. An increase in the intensity of the light output is brought about as a result of this. If the load moves over the first fiber Bragg grating FBG1 towards the second fiber Bragg grating FBG2, the first fiber Bragg grating FBG1 is stretched, the Bragg wavelength $\lambda 1$ of the first fiber Bragg grating FBG1 is therefore shifted to smaller wavelengths (along the falling filter edge K1) while the second fiber Bragg grating FBG2 is compressed, the Bragg wave-length $\lambda 2$ of the second fiber Bragg grating FBG2 is therefore shifted to larger wavelengths (along the falling filter edge K2). This results in the difference signal SD in the profile shown in FIG. 4. A wheel pulse RI1 is detected if the difference signal SD falls below a predetermined limiting value G.

Figure 5:
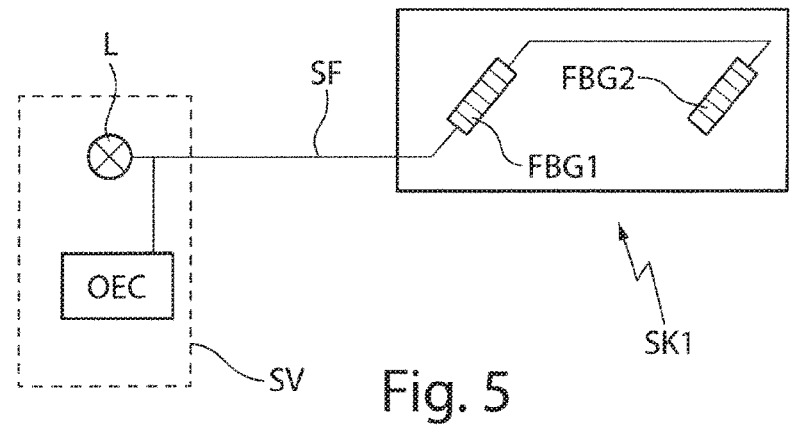
FIG. 5 shows the schematic structure of a rail-contacting half of an axle-counting device according to the invention according to the RR concept.

FIG. 5 shows the structure of a rail-contacting half SK1 of an axle-counting device according to the RR concept. The rail-contacting half SK1 comprises a sensor fiber SF having two fiber Bragg gratings FBG1, FBG2, which are spaced apart from one another and are prefer-ably preassembled on a bracket T such that they can be mounted simply on a rail S in the desired orientation (see FIG. 13a, b). The fiber Bragg gratings FBG1, FBG2 have different Bragg wavelengths $\lambda 1$, $\lambda 2$ and accordingly reflect light of the relevant Bragg wavelength $\lambda 1$, $\lambda 2$. Light is coupled into the sensor fiber SF via a light source L. The light reflected by the fiber Bragg gratings FBG1, FBG2 is transmitted into a signal processing unit SV, in which the reflected light is processed. The light source L in the present case is part of the signal processing unit SV.

Figure 6:
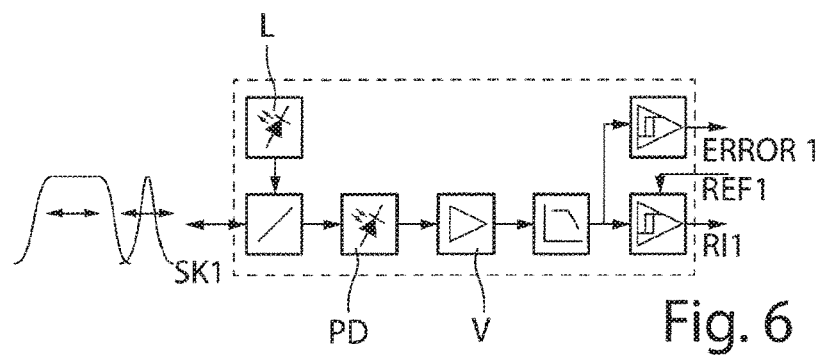
FIG. 6 is a block wiring diagram of the processing of an optical signal received by one of the rail-contacting halves from FIG. 5 (RR concept)

FIG. 6 shows how the reflected light is subsequently processed within the signal processing unit SV. The reflected light is detected as an electrical difference signal SD by means of a photodiode PD. Shifts of the Bragg wavelengths $\lambda 1$, $\lambda 2$ of the two fiber Bragg gratings FBG1, FBG2. A transimpedance amplifier V converts the difference signal SD into a stress signal. Said stress signal can now be subsequently processed (for example, by low pass filtering). The analogue signal can then be converted into a digital wheel signal (wheel pulse RI1) with the aid of a comparator.

Figure 7A:
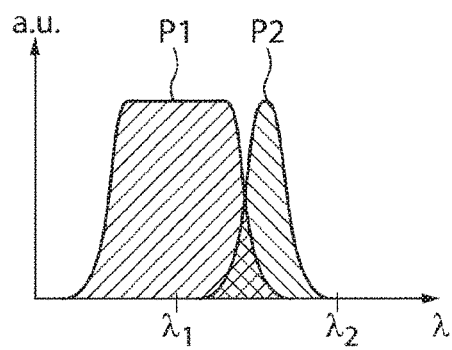
FIG. 7a, b shows the arrangement of the reflection peak in an unloaded and in a loaded state.
Figure 7B:
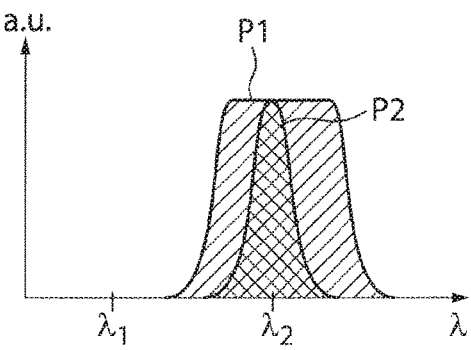

FIG. 7a, b show a particularly advantageous example of the reflection peaks P1, P2 of the two fiber Bragg gratings FBG1, FBG2 in an unloaded state (FIG. 7a) and in a loaded state (FIG. 7b). The reflection peaks P1, P2 have different full widths at half maximum FWHM. In the unloaded state, the reflection peaks P1, P2 overlap slightly in the example shown such that shifts of the reflection peaks to larger and also to smaller wavelengths lead to a change in light intensity, a shift of the reflection peaks P1, P2 away from one another causing an increase in intensity whereas a shift of the reflection peaks P1, P2 towards one another brings about a decrease in intensity since an overlapping of the reflection peaks P1, P2 reduces the bandwidth of the reflected light. A difference signal SD is generated by the over-lapping of the reflection peaks P1, P2 since part of the light to be reflected by the second fiber Bragg grating FBG2 is already reflected by the first fiber Bragg grating FBG1 and therefore does not reach the second fiber Bragg grating FBG2 and consequently cannot be reflected by the second fiber Bragg grating FBG2.

Figure 8:
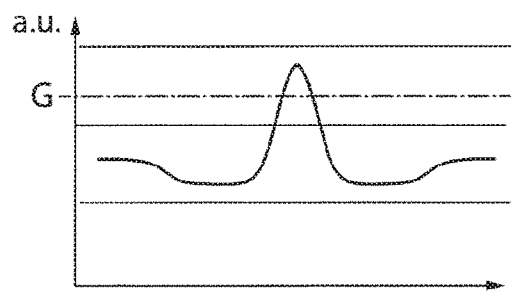
FIG. 8 shows the temporal profile of the difference signal according to the RR concept.

FIG. 8 is a diagram of the profile of the difference signal SD. In the example shown, the first fiber Bragg grating is compressed owing to an approaching load and the first reflection peak P1 of the first fiber Bragg grating FBG1 is shifted to larger wavelengths, i.e. towards the second reflection peak P2. As a result of this, the overlapping of the reflection peaks P1, P2 increases, which leads to a reduction in intensity of the light output. If the load moves over the first fiber Bragg grating FBG1 towards the second fiber Bragg grating FBG2, the first fiber Bragg grating FBG1 is stretched, the Bragg wavelength $\lambda 1$ of the first fiber Bragg grating FBG1 and therefore the first reflection peak P1 is shifted to smaller wavelengths, while the second fiber Bragg grating FBG2 is compressed, the second reflection peak P2 of the second fiber Bragg grating FBG2 is therefore shifted to larger wavelengths. The reflection peaks P1, P2 therefore move away from one another. As a result of this, the overlap of the reflection peaks P1, P2 reduces, which leads to a rapid increase in the intensity of the light output. This results in the profile of the difference signal SD shown in FIG. 8. A wheel pulse RI1 is detected if the difference signal SD exceeds a predetermined limiting value G.

Figure 9:
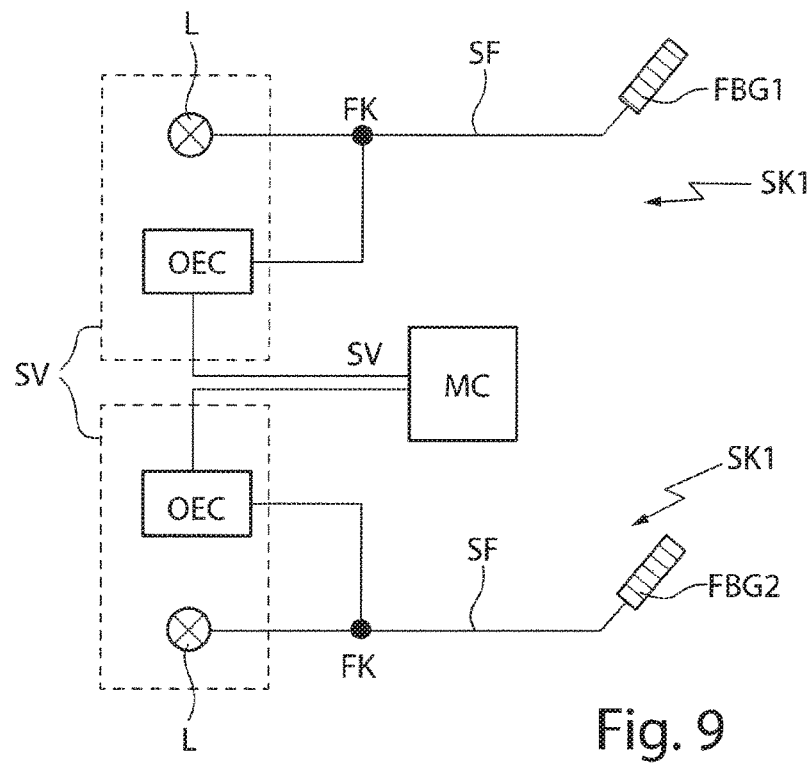
FIG. 9 shows the schematic structure of two rail-contacting halves of an axle-counting device according to the invention according to the EO2 concept.

FIG. 9 shows the structure of two rail-contacting halves SK1, SK2 of an axle-counting device according to the invention according to the EO2 concept. The rail-contacting halves SK1, SK2 each comprise one sensor fiber SF having one fiber Bragg grating FBG1, FBG2. The fiber Bragg gratings FBG1, FBG2 of the two rail-contacting halves SK1, SK2 have Bragg wavelengths $\lambda 1$, $\lambda 2$ and accordingly reflect light of the relevant Bragg wavelength $\lambda 1$, $\lambda 2$. In this variant, the Bragg wavelengths $\lambda 1$, $\lambda 2$ can be the same. Light is coupled into the sensor fibers SF via a light source L in each case. In principle, however, just one single light source can be provided which supplies light into the two sensor fibers SF. The light reflected by the fiber Bragg gratings FBG1, FBG2 is transmitted by means of a fiber coupler FK to an optoelectronic component OEC within each rail-contacting half SK1, SK2, in which optoelectronic component the reflected light is processed. The optoelectronic components OEC and the light source L are parts of the signal-processing unit SV in the present case. The optoelectronic components OEC convert the detected signals into electrical currents, process said currents and subsequently conduct them to a microcontroller MC in which a difference signal is generated. Within the microcontroller MC, a digital signal is generated from the difference signal by means of establishing the threshold value, which digital signal is emitted as a wheel pulse.

Figure 10:
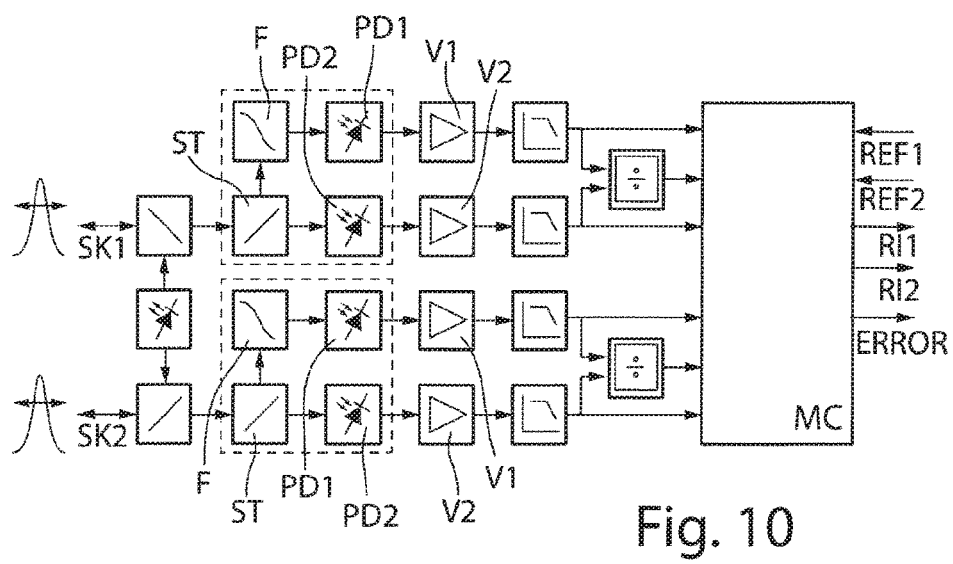
FIG. 10 is a block wiring diagram of the processing of signals received by the two rail-contacting halves according to FIG. 9 (OE2 concept)

FIG. 10 shows how the reflected light is subsequently processed in the signal-processing units SV. The light reflected in the two sensor fibers SF is transmitted from the sensor fibers SF into the optoelectronic components OEC, in which the light is split by means of a beam splitter ST. The reflected light is filtered within a first channel in each case by means of wavelength filters F having a filter edge K and detected as shear stress signals S1, S2 by means of first photodiodes PD1. The reflected light is transmitted directly onto second photodiodes PD2 within a second channel in each case and detected there as reference signals SR1, SR2, the reference signals SR1, SR2 being proportional to the total light output reflected in the relevant sensor fiber SF1, SF2. Transimpedance amplifiers V1, V2 convert the shear stress signals S1, S2 and the reference signals SR1, SR2 into stress signals. Said stress signals can now be subsequently processed (for example, by low pass filtering). In order to determine the actual signals to be subsequently processed, the ratio between the difference signal SD and the reference signal SR is provided. These ratio signals are then transmitted to the microcontroller MC, which generates a difference signal by subtracting the electrical signals.

Figure 11:
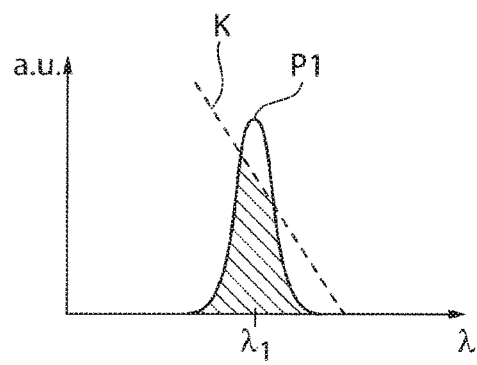
FIG. 11 shows the arrangement of a reflection peak relative to the filter edge in an unloaded state of the rail.

FIG. 11 shows a possible profile of the first filter edge K relative to the first reflection peak P1 of the first fiber Bragg grating FBG1. The filter edge K extends through the reflection peak P1 such that shifts of the reflection peak to larger and also to smaller wavelengths lead to a change in light intensity, a shift of the first reflection peak P1 to larger wavelengths causing a reduction in intensity, whereas a shift of the first reflection peak P1 to smaller wavelengths causes an increase in intensity. The profile of the second filter edge K relative to the second reflection peak P2 of the second fiber Bragg grating FBG2 is preferably the same.

Figure 12A:
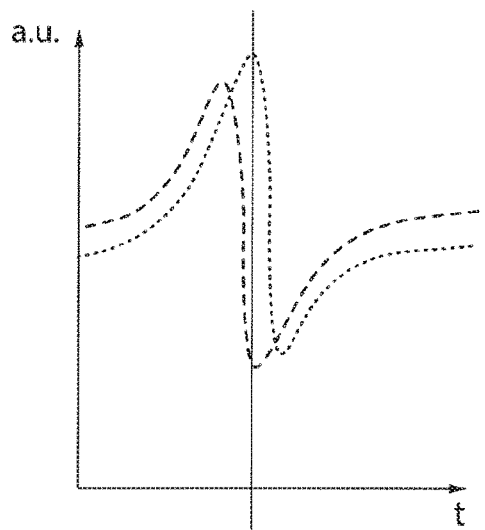
FIG. 12a shows the temporal profile of the shear stress signals of the two rail-contacting halves according to the OE2 concept.

FIG. 12a shows the temporal profile of the shear stress signals of the two rail-contacting halves according to the OE2 concept.

Figure 12B:
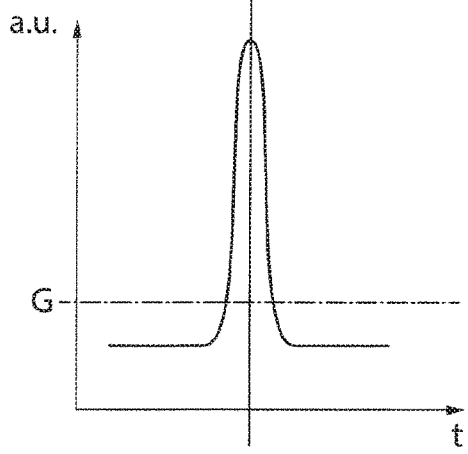
FIG. 12b shows the temporal profile of the difference signal according to the OE2 concept.

If the difference of the two shear stress profiles is formed, this is at a maximum when the load transfer into the rails by the wheel takes place precisely between the two sensors, as shown in FIG. 12b.

Figure 13A:
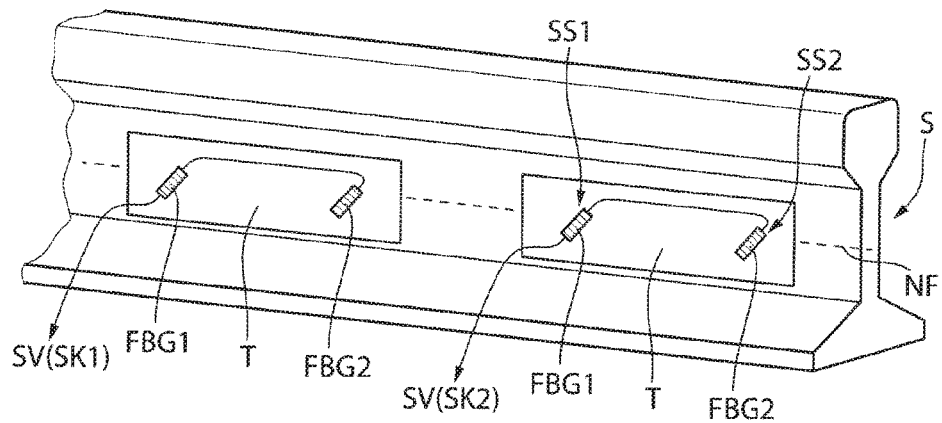
FIG. 13a shows fiber Bragg gratings of two rail-contacting halves fastened to a rail ac-cording to the OEC and RR concepts with separate sensor fibers.
Figure 13B:
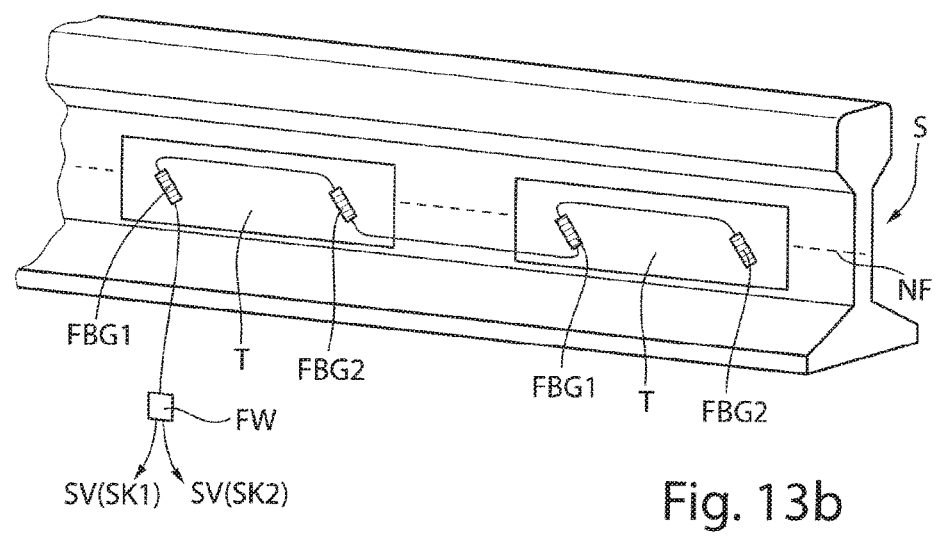
FIG. 13b shows fiber Bragg gratings of two rail-contacting halves fastened to a rail ac-cording to the OEC and RR concepts with a common sensor fiber.

FIG. 13a, 13b show fiber Bragg gratings FBG1, FBG2, which are fastened to a rail S, of two rail-contacting halves SK1, SK2 according to the OEC and RR concepts. A first fiber Bragg grating FBG1 and a second fiber Bragg grating FBG2 are each arranged together on a bracket T at two sensor positions SS1, SS3 which are spaced apart from one another in the rail direction, which bracket is mounted on the rail S under pretension. In FIG. 13a, a separate sensor fiber SF is provided for each rail-contacting half SK1, SK2 into which sensor fiber the first fiber Bragg grating FBG1 and the second fiber Bragg grating FBG2 are written, the two fiber Bragg gratings FBG1, FBG2 being spaced apart from one another. FIG. 13b shows an-other embodiment, in which the fiber Bragg gratings FBG1, FBG2 of the two rail-contacting halves SK1, SK2 are part of one single sensor fiber SF. The signals are transmitted by means of a frequency-separating filter FW to the signal processing units SV of the corresponding rail-contacting halves SK1, SK2. The four fiber Bragg gratings FBG1, FBG2 must, however, have different Bragg wavelengths for this purpose.

Figure 13C:
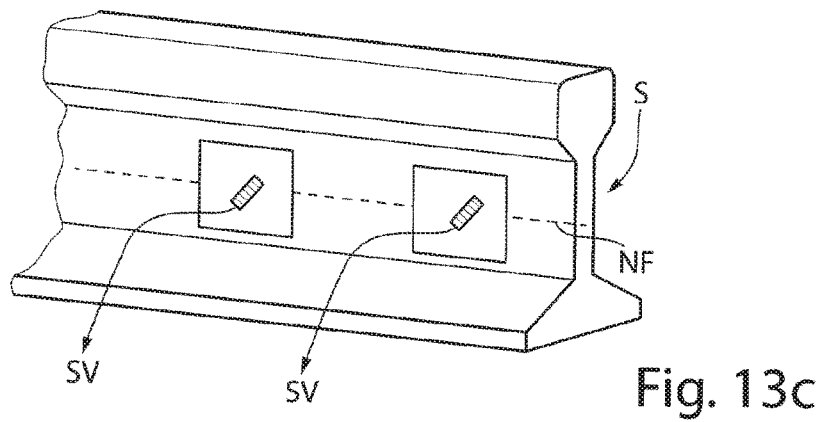
FIG. 13c shows fiber Bragg gratings of two rail-contacting halves fastened to a rail ac-cording to the OE2 concept.

FIG. 13c shows fiber Bragg gratings of two rail-contacting halves fastened to a rail according to the OE2 concept. Each fiber Bragg grating FBG1, FBG2 is written into its own sensor fiber SF1, SF2 and preassembled on a bracket T in each case.

In FIG. 13a and FIG. 13c, the fiber Bragg gratings FBG1, FBG2 are fastened to the rail at a 45° angle relative to the neutral fiber NF. FIG. 13b on the other hand shows an embodiment in which the fiber Bragg gratings FG1, FBG2 are fastened to the rail at an angle of −45° relative to the neutral fiber NF. The two attachment options are possible with all three concepts described here. The different orientations of the fiber Bragg gratings FBG1, FBG2 in FIG. 13a, c on the one hand and FIG. 13b on the other hand have the effect that the shear stress signals and also the difference signal having different algebraic signs are emitted. Preferably, an orientation is selected such that the wheel signal is emitted as a minimum. Preferably, the two fiber Bragg gratings are arranged at a spacing of about 150 mm from one another. If the two sensor elements are located close enough to one another (preferably closer than 150 mm), they also both experience the same temperatures such that a varying temperature behavior of the fiber Bragg gratings does not occur. Torsions of the rail as a result of lateral input of force into the rail head can also be compensated in this manner.

Figure 14:
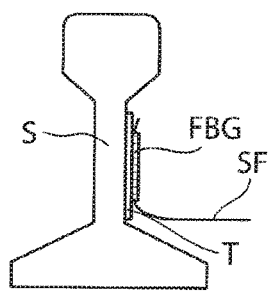
FIG. 14 is a cross section of a rail with a fiber Bragg grating fastened to the rail ac-cording to FIG. 13a-c.

FIG. 14 is a cross section of a rail S, having a fiber Bragg grating attached to the rail S by means of a bracket T according to FIG. 13a-c.

Figure 15:
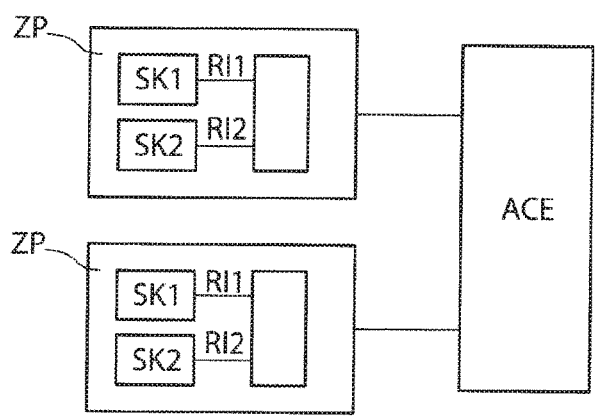
FIG. 15 shows the general structure of an axle-counting device according to the invention.

FIG. 15 shows the general structure of an axle-counting device according to the invention. The axle-counting device shown comprises two counting units ZP each having two rail-contacting halves SK1, SK2, each rail-contacting half SK1, SK2 generating a wheel pulse RI1, RI2 which is transmitted to a counting device within each counting unit. The direction of travel can be determined within each counting unit using the wheel pulse RI1, RI2. The detected information (wheel pulses RI1, RI2, direction of travel) are transmitted to an evaluation unit ACE.

LIST OF REFERENCE SIGNS

ACE evaluation unit
F wavelength filter
FBG1, FBG2 fiber Bragg gratings
FK fiber coupler
FW frequency separating filter
FWHM full width at half maximum
G limiting value
K, K1, K2 filter edges
L light source
MC microcontroller
NF neutral fiber
OEC optoelectronic component
P1, P2 reflection peaks
PD, PD1, PD2 photodiodes
RI1, RI2 wheel pulse
SK1, SK2 rail-contacting halves
S rail
SF sensor fiber
SS1, SS2 sensor positions
ST beam splitter
SV signal processing unit
SD difference signal
SR, SR1, SR2 reference signal
S1, S2 shear stress signals
T bracket
V, V1, V2 transimpedance amplifier
ZP counting unit
λ1, λ2 Bragg wavelengths

What is claimed is:

1. An axle-counting method for railbound vehicles, the method comprising the steps of:
coupling light into at least one sensor fiber, wherein the sensor fiber comprises at least two fiber Bragg gratings mounted on a rail intersecting and arranged obliquely with respect to a neutral axis of the rail, wherein each fiber Bragg grating has a reflection spectrum having a reflection peak which is at a Bragg wavelength and has a full width at half maximum;

detecting the light reflected by two fiber Bragg gratings spaced apart from one another and obtaining from the two fiber Bragg gratings a respective shear stress signal of the rail;
generating a shear stress difference signal from the two respective shear stress signals from the two fiber Bragg gratings; and
generating a wheel signal within a signal-processing unit if the shear stress difference signal exceeds a predetermined first upper limiting value or falls below a predetermined second lower limiting value.

2. The axle-counting method according to claim 1, wherein sensor fibers each having two fiber Bragg gratings that are arranged in a row and have different Bragg wavelengths are used at two sensor positions that are spaced apart from one another in the rail direction, and wherein the shear stress difference signal is generated optically within a signal-processing unit by means of an optoelectronic component by the temporal intensity profile of the light output reflected in the sensor fiber being filtered at two filter edges of a wavelength filter of the optoelectronic component by means of the optoelectronic component, the filter edges each being in the range of one of the Bragg wavelengths of the fiber Bragg grating and having gradients having different algebraic signs, and wherein the filtered intensity profile is detected as the difference signal, and wherein wheel signals are generated by processing the difference signal within a signal-processing unit.

3. The axle-counting device for performing the method according to claim 2, comprising:
a light source;
at least one counting unit, wherein each counting unit comprises two rail-contacting halves for mounting to a rail, wherein each rail-contacting half comprises:
a sensor fiber comprising a first fiber Bragg grating having a first Bragg wavelength and a second fiber Bragg grating having a second Bragg wavelength, wherein the fiber Bragg gratings are designed to be mounted on the rail obliquely with respect to the neutral fiber;
a signal-processing unit having an optoelectronic component for performing an optical subtraction of the light output reflected by the two fiber Bragg gratings of a sensor fiber, wherein the optoelectronic component comprises a wavelength-dependent filter having two filter edges, wherein the filter edges are each in the range of one of the Bragg wavelengths of the fiber Bragg grating and have gradients having different algebraic signs.

4. The axle-counting device according to claim 3, wherein the gradients of the filter edges are of the same absolute value.

5. The axle-counting device according to claim 4, wherein the fiber Bragg gratings of the two rail-contacting halves of a counting unit are arranged within a common sensor fiber.

6. The axle-counting method according to claim 2, wherein the full widths at half maximum of the reflection peaks of the two fiber Bragg gratings differ by less than 0.5 nm, and the reflectivity's of said gratings differ by less than 20%.

7. The axle-counting method according to claim 2, wherein a reference signal is detected from the temporal intensity profile of the light output reflected in the sensor fiber, without said reference signal being filtered by means of the optoelectronic component, and wherein the difference signal is compared with the reference signal.

8. Axle-counting device for performing the method according to claim 7, comprising:
a light source;
at least one counting unit, wherein each counting unit comprises two rail-contacting halves for mounting to a rail, wherein each rail-contacting half comprises:
a sensor fiber, comprising two fiber Bragg gratings arranged in a row, at two sensor positions that are spaced apart from one another, wherein the fiber Bragg gratings are designed to be mounted on the rail obliquely with respect to the neutral fiber, and wherein the Bragg wavelengths of the two fiber Bragg gratings and the distance between the two sensor positions are selected such that the reflection peaks of the two fiber Bragg gratings overlap when the rail is subjected to a predetermined load between the two sensor positions;
a signal-processing unit for detecting and subsequently processing the light reflected by the fiber Bragg grating.

9. The axle-counting device according to claim 8, wherein the full widths at half maximum of the reflection peaks of the two fiber Bragg gratings differ by 1 to 2 orders of magnitude.

10. The axle-counting device according to claim 9, wherein the Bragg wavelengths of the two fiber Bragg gratings do not differ by more than 5 nm, and in that the full width at half maximum of one fiber Bragg grating is at least 0.05 nm and the full width at half maximum of the other fiber Bragg grating is at most 5 nm.

11. The axle-counting method according to claim 1, wherein sensor fibers having two fiber Bragg gratings that are arranged in a row and have different Bragg wavelengths are used at two sensor positions that are spaced apart from one another in the rail direction, and wherein the shear stress difference signal is generated optically by a spectral overlap of the reflection peaks of the two fiber Bragg gratings during the transition from an unloaded state to a loaded state.

12. The axle-counting method according to claim 11, wherein the reflection peaks overlap in the loaded state.

13. The axle-counting method according to claim 1, wherein two sensor fibers each having one fiber Bragg grating are used, the fiber Bragg gratings of different sensor fibers being arranged at sensor positions that are spaced apart from one another in the rail direction, and wherein, for each sensor fiber, a filtered signal of the temporal intensity profile of the light output reflected by the fiber Bragg grating in the sensor fiber is generated as a shear stress difference signal within a signal-processing unit by filtration at each filter edge of a wavelength filter of an optoelectronic component, and wherein the shear stress difference signal of the two fiber Bragg gratings is generated electronically by means of a microcontroller.

14. The axle-counting device for performing the method according to claim 13, comprising:
a light source;
wherein each counting unit comprises two rail-contacting halves for mounting on a rail, wherein each rail-contacting half comprises:
a sensor fiber comprising a fiber Bragg grating having a Bragg wavelength, wherein the fiber Bragg grating is designed to be mounted on the rail obliquely with respect to the neutral fiber;
a signal-processing unit for generating shear stress signals, wherein the signal-processing unit comprises an optoelectronic component having a filter edge; and comprising a microcontroller for generating a difference signal of the shear stress signals emitted by the signal-processing units.

15. The axle-counting device according to claim 14, wherein the fiber Bragg gratings are attached to the rail in parallel with one another at an angle of from ±30° to ±60°, in particular ±45°, with respect to the neutral fiber.

16. The axle-counting device according to claim 15, wherein the fiber Bragg gratings intersect the neutral fiber of the rail.

17. The axle-counting device according to claim 16, wherein the fiber Bragg gratings are equipped with a converter structure for compensating for temperature expansion of the rail.

18. The axle-counting device according to claim 17, wherein the fiber Bragg gratings are fastened to the rail under pretension.

19. The axle-counting device according to claim 18, wherein a trimming device is provided for adjusting the pretension under which the fiber Bragg gratings are mounted onto the rail.

20. The axle-counting device according to claim 19, wherein the signal-processing unit comprises a fiber-optic beam splitter.

21. The axle-counting method according to claim 13, wherein a reference signal is detected from the temporal intensity profile of the light output reflected in the sensor fiber, without said reference signal being filtered by means of the optoelectronic component, and wherein the shear stress signal is determined from the ratio of filtered signal to reference signal.

22. The axle-counting method according to claim 1, wherein a fault is identified if the reference signal falls below a predetermined third limiting value.

* * * * *